W. T. A. FAULKNER.
CLUTCH MECHANISM.
APPLICATION FILED AUG. 23, 1915.
1,165,327.
Patented Dec. 21, 1915.
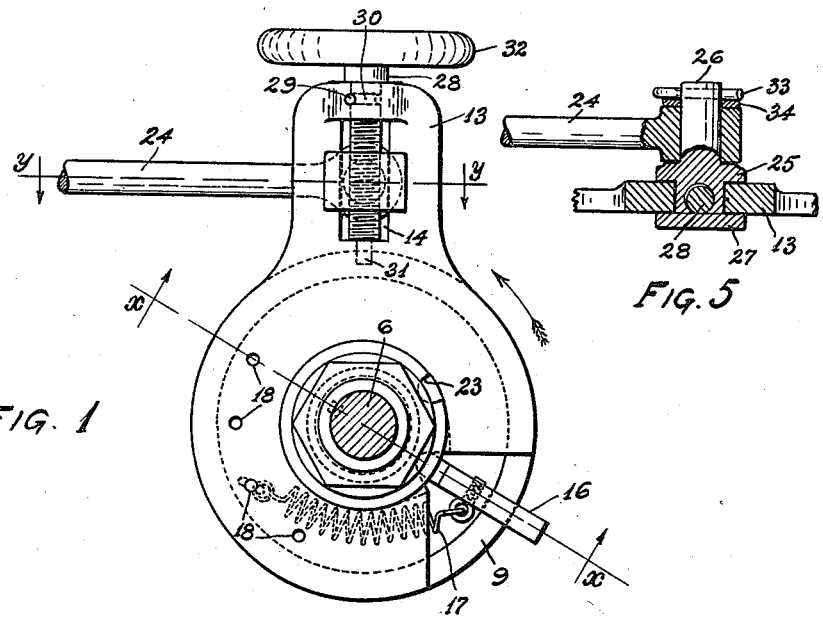
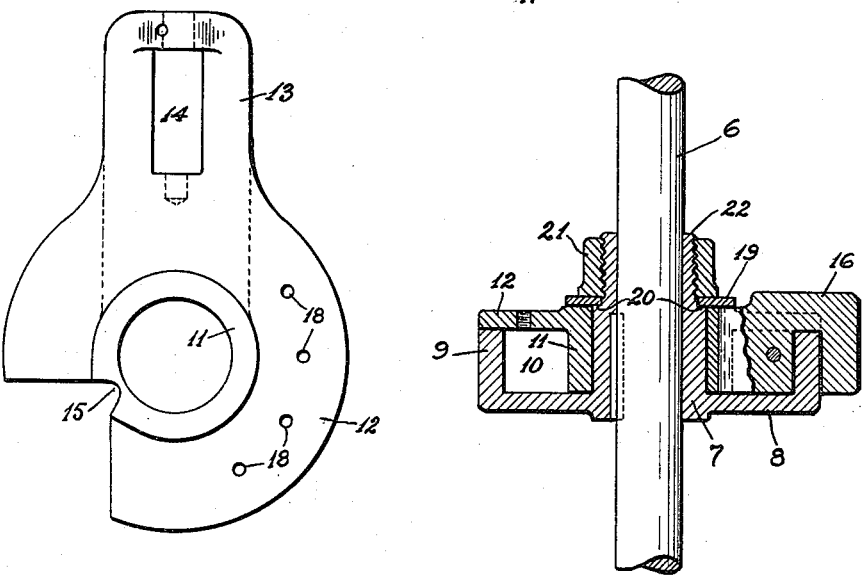
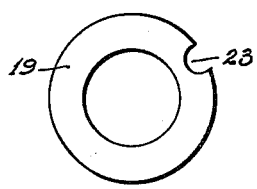
WITNESSES:
O. Johnson
Frank Warren
INVENTOR
William T. A. Faulkner
BY
C. D. Haskins
ATTORNEY

UNITED STATES PATENT OFFICE.

WILLIAM T. A. FAULKNER, OF SEATTLE, WASHINGTON.

CLUTCH MECHANISM.

1,165,327. Specification of Letters Patent. Patented Dec. 21, 1915.

Application filed August 23, 1915. Serial No. 46,794.

*To all whom it may concern:*

Be it known that I, WILLIAM T. A. FAULKNER, citizen of the United States, residing at Seattle, in the county of King and State of Washington, have invented a certain new and useful Improvement in Clutch Mechanism, of which the following is a specification.

My invention relates to improvements in transmission clutches, and the object of my improvements is to provide a clutch mechanism in association with a reciprocally movable connecting rod and a rotatable shaft which shall be adapted to operate to rotate said shaft in a constant direction in response to reciprocal movements of said connecting rod, and which shall be simple in its plan of construction, durable, and reliable in its operation, and which, further, shall be especially adapted to be associated with the feeding mechanism of a shingle sawing machine whereby such feeding mechanism may be actuated intermittently to move shingle bolts in a direction toward the saw of said machine. I accomplish this object by devices illustrated in the accompanying drawings wherein—

Figure 1 is a view in side elevation of a transmission clutch embodying my invention; Fig. 2 is a sectional view of the same on broken line $x$, $x$ of Fig. 1; Fig. 3 is a view in elevation of the inner side of a part of the same; Fig. 4 is a view in side elevation of another part of the same; and Fig. 5 is a view of the same in horizontal section on broken line $y$, $y$ of Fig. 1.

Referring to the drawings, throughout which like reference numerals indicate like parts, 6 represents a fragment of a shaft that is to be intermittently moved to rotate in a constant direction, as, for instance, a shaft forming a part of the feeding mechanism of a shingle sawing machine, not shown, and securely fastened on said shaft 6 is the hub 7 of a flanged disk 8 whose flange 9 is formed to provide an annular recess 10 disposed concentrically between said hub 7 and said flange 9 as more clearly shown in Fig. 2.

Rotatably mounted on the hub 7 is a sleeve 11 which is provided with an integral plate 12 disposed to engage with the face of the flange 9 to cover the annular recess 10, and said plate 12 is provided with an integral portion 13 that projects upwardly beyond the flange 9 of the disk 8, through which portion 13 extends an oblong hole 14 as shown more clearly in Fig. 3. The sleeve 11 is provided with a longitudinal recess 15 and adjacent to said recess an annular segment of the plate 12 is removed, as shown in said Fig. 3.

As shown in Figs. 1 and 2, a clutch member 16, of well known form, having clutching surfaces formed by a slot and being disposed within the recess 10 with its inner end projecting into the recess 15 of the sleeve 11, while said clutching surfaces of said slot are adapted to engage with the inner and outer surfaces of the flange 9 to clutch said flange 9 to rotate it in an obvious manner only in one direction in response only to a rotary movement in one direction of the sleeve 11 while a rotary movement of said sleeve 11 in the opposite direction will cause said clutching surfaces to slip on the flange 9, in a manner well known, without rotating said flange and the shaft 6.

In order that the clutch 16 may be maintained normally in a position to clutch the flange 9 when the plate 12 is rotatively moved in the direction of the arrow shown in Fig. 1, I have provided a helical tension spring 17 disposed within the recess 10, one end of which spring 17 is connected with the clutch 16 while its other end is connected with a stud removably disposed in one of a plurality of holes 18 provided in the plate 12, as indicated by dotted lines in Fig. 1, said holes 18 being disposed at short distances apart whereby the active force of the spring 17 may be adjusted by removing the stud, to which the spring 17 is attached, from one of the holes to another.

In order that the clutch 16 may be confined in its operative position so that its clutching surfaces may always engage evenly with the flange 9 I have provided a washer 19 which is clamped against a shoulder 20 formed on the hub 7, by means of a nut 21 which screws on to an extended screw-threaded portion 22 of said hub 7. The washer 19 is of such larger diameter than the hub 7 as will adapt it to engage with the inner end portion of the clutch 16 and with the outer side of the plate 12 thus to prevent an outward movement of the clutch 16 and to confine the plate 12 in slidable engagement with the face of the flange 9; and in order that the clutch 16 may be removed from the structure for any purpose without wholly unscrewing and removing the nut 21, the washer 19 is provided with a notch 23 so that when said washer 19 is turned to a circumferential position on the hub 7 to register with the slot 15 in the sleeve 11, then the clutch 16 may be withdrawn from the recess 10, said notch 23 permitting the end of the clutch 16 to pass the washer 19 in an obvious manner; but under normal conditions of operation said washer 19 is circumferentially disposed and secured on the hub 7 with its notch 23 at a distance from said notch 15. Thus to remove the clutch 16 from the structure the nut 21 is slightly loosened to free the washer 19 which is then turned so that its notch 23 registers with the slot 15 then the end of the spring 17 is detached from the clutch 16 whereupon said clutch 16 may be easily withdrawn and removed for any purpose, as for instance, a renewal or adjustment of its wearing parts or for the purpose of replacing it with a new clutch of like form.

As shown in Fig. 1, the upwardly projecting portion 13 of the plate 12 is adjustably associated with a connecting rod 24 (which may be associated with the feeding mechanism of a machine not shown as, for instance, the feeding mechanism of a shingle sawing machine, whereby said rod 24 may be caused to move reciprocally in an endwise direction) by means of a block 25 which is provided with an integral stud 26, said block 25 being disposed to be vertically slidable in the oblong hole 14 and being maintained in its slidable position by a plate 27 secured to its front side in engagement with the front surface of the portion 13.

An adjusting screw 28 is rotatably mounted in the upwardly projecting portion 13 and is prevented from endwise movement by a pin 29 that engages with the sides of a groove 30 formed in the shank of the adjusting screw 28, as indicated by dotted lines in Fig. 1. The screw-threaded portion of the adjusting screw 28 is disposed to extend lengthwise of and within the oblong hole 14 and also extends through a screw-threaded hole in the block 25 while the lower end portion of said adjusting screw 28 is reduced in diameter to form a pivot 31 which finds its bearing at the lower end of the oblong hole 14 as indicated in Fig. 1, and the upper end of said adjusting screw 28 is provided with a hand wheel 32 whereby it may be rotated to cause the block 25 with its integral stud 26 to be raised or lowered in an obvious manner.

The stud 26 is articulated with the connecting rod 24 whose end portion is secured in its position thereon by a cotter pin 33 and a washer 34 as shown more clearly in Fig. 5. Thus the block 25 may be adjusted to be at different distances from the axis of the shaft 6 thereby to vary as required the extent of rotative movement of the shaft 6 in response to each of the longitudinal movements of the shaft 24 through a given distance, such longitudinal movements of said rod 24 toward the right hand causing the clutch 16 to slip on the flange 9 without moving the shaft 6 while movements of said rod 24 toward the left hand will cause the clutch 16 to clutch said flange 9 and move said shaft 6 in a contra-clockwise direction as indicated by the arrow in Fig. 1.

Obviously, changes may be made in the forms, dimensions and arrangement of parts of my invention without departing from the spirit thereof.

What I claim is:

1. In a clutch mechanism of the class described, the combination with a rotatable shaft, of a flanged disk having an integral hub, provided with a longitudinal recess in its periphery, and disposed to project from the flanged side thereof to form an annular recess therein, said disk being fastened on said shaft concentric therewith; a plate provided with a sleeve projecting from one of its sides and disposed with such one of its sides adjacent to the flange of said disk and with said sleeve surrounding said hub to be rotatable thereon; a clutch member having clutching surfaces adapted to engage with the flange of said disk and loosely disposed in said annular recess with one of its ends in the longitudinal recess in said hub; a notched washer disposed to surround said hub normally to engage with the outer side of said clutch member; means for securing said hub in its normal position; a stud adjustably secured to said plate to project from one side thereof, and adapted to be articulated with a connecting rod of a machine; and an adjusting screw associated with said plate and with said stud and adapted to be operated to move said stud from one position to another with respect to said shaft.

2. A clutch mechanism of the class described, which embodies a flanged disk having an integral hub provided with a screw-threaded portion and adapted to be fixed on a rotatable shaft in a position concentric therewith; a plate provided with a sleeve that projects from one of its sides, said sleeve being rotatably mounted on said hub of said disk in a position to cause said plate to engage with the flange of said disk; a clutch member associated with said sleeve and said flange and adapted to clutch said flange in response to a rotary movement of said sleeve; a notched washer disposed on said hub adjacent to the outer side of said plate; and a nut disposed on the screw-threaded portion of said hub and adapted to secure said washer in a circumferential position normally to hold said plate in engagement with said clutch member.

In witness whereof, I hereunto subscribe my name this 14th day of August, A. D., 1915.

WILLIAM T. A. FAULKNER.

Witnesses:
FRANK WARREN,
A. HASKINS.